(12) United States Patent
McCann et al.

(10) Patent No.: US 6,438,742 B1
(45) Date of Patent: Aug. 20, 2002

(54) OBJECT-ORIENTED SYSTEM AND METHOD FOR VISUALLY GENERATING SOFTWARE APPLICATIONS

(75) Inventors: John T. McCann, Austin; Steven R. Garms, Euless, both of TX (US)

(73) Assignee: Visual Click Software, Inc., Austin, TX (US)

( * ) Notice: Subject to any disclaimer, the term of this patent is extended or adjusted under 35 U.S.C. 154(b) by 0 days.

(21) Appl. No.: 09/322,494

(22) Filed: May 28, 1999

(51) Int. Cl.[7] ............................................... G06F 9/44
(52) U.S. Cl. ......................................................... 717/109
(58) Field of Search ................................. 717/1, 2, 109, 717/104–108, 110–113; 345/762, 763, 764, 769

(56) References Cited

U.S. PATENT DOCUMENTS

| | | | | |
|---|---|---|---|---|
| 5,710,894 A | * | 1/1998 | Maulsby et al. | 395/326 |
| 5,862,379 A | * | 1/1999 | Rubin et al. | 717/2 |
| 5,913,063 A | * | 6/1999 | McGurrin et al. | 717/2 |
| 5,991,535 A | * | 11/1999 | Fowlow et al. | 717/2 |
| 6,189,142 B1 | * | 2/2001 | Johnson et al. | 717/4 |
| 6,243,861 B1 | * | 6/2001 | Nitta et al. | 717/3 |

OTHER PUBLICATIONS

Lange et al. Object–Oriented Program Tracing and Visualization. ACM. 1997. pp. 63–70.*
Wong et al. An Automatic Software Generation Approach for Easier Distributed Programming. IEEE. 1996. pp. 1553–1558.*

* cited by examiner

*Primary Examiner*—Gregory Morse
*Assistant Examiner*—Wei Zhen
(74) *Attorney, Agent, or Firm*—Hughes & Luce LLP

(57) ABSTRACT

An object-oriented system and method for visually generating software applications. The object-oriented system for visually generating software applications includes a visual interface for defining and linking control objects and corresponding services to create an intermediate command instruction file. Any control object or command instruction file can be edited and/or modified at any time. Also included is a run-time program for interpreting the intermediate command instruction file and generating the desired software applications.

36 Claims, 8 Drawing Sheets

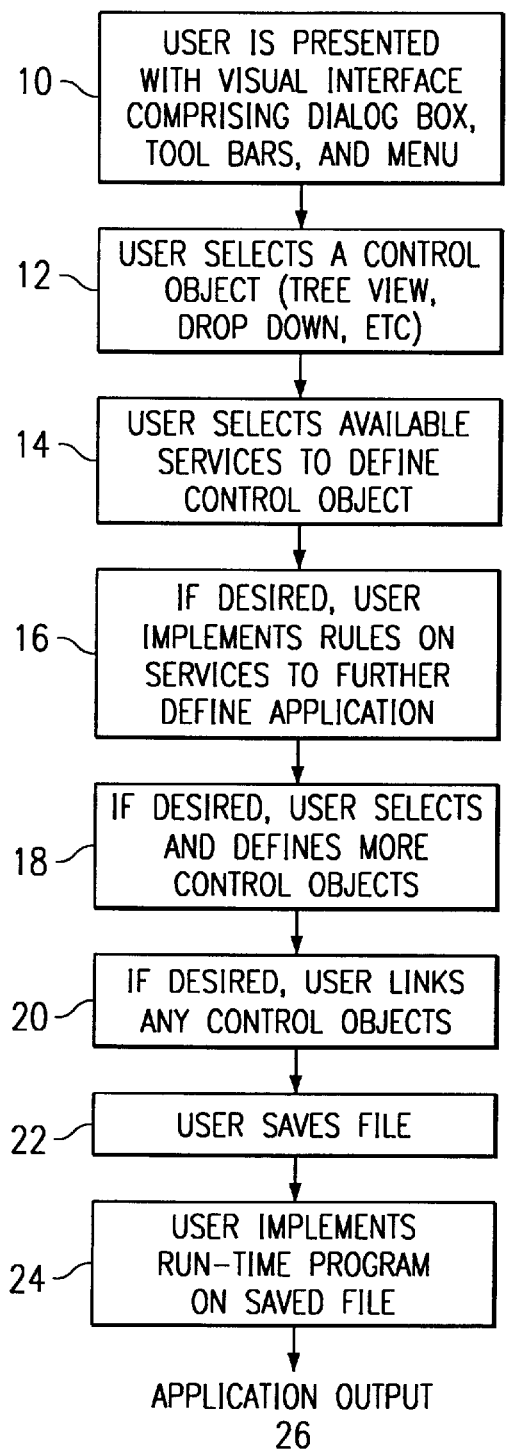
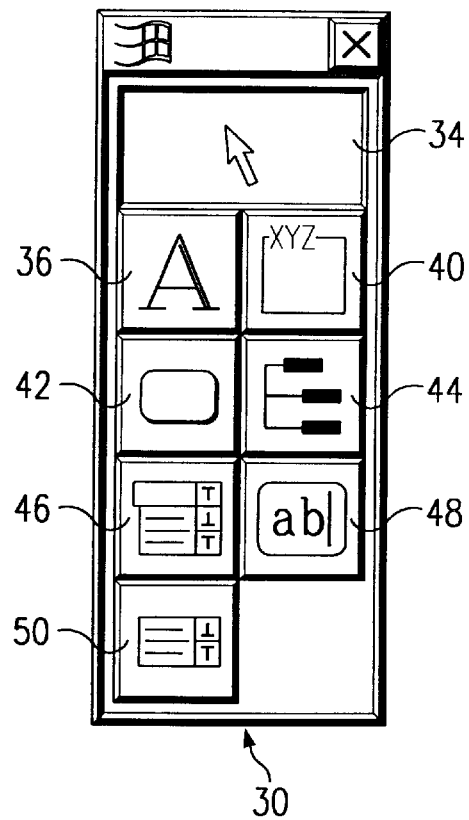

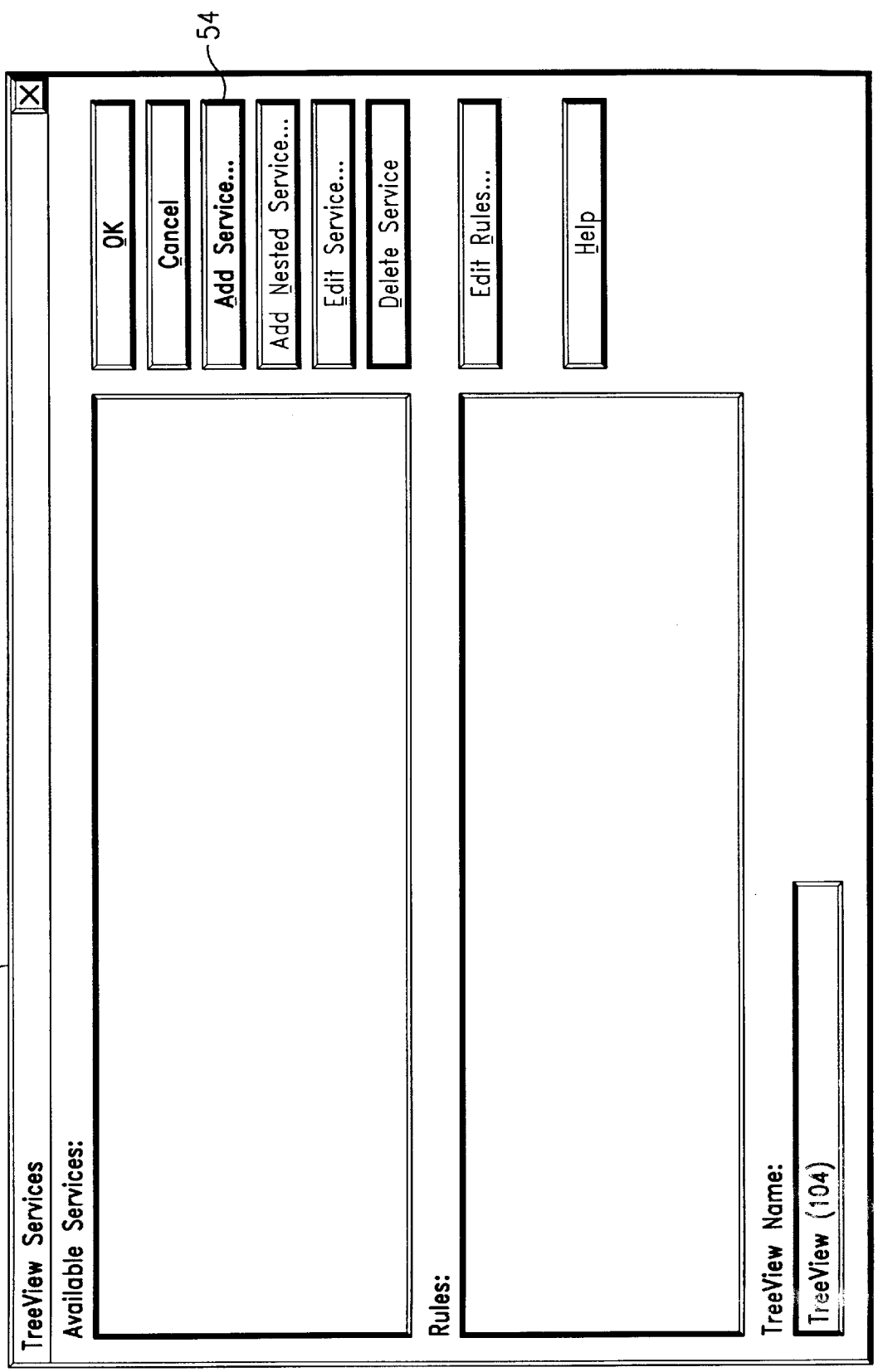

OBJECT-ORIENTED SYSTEM AND METHOD FOR VISUALLY GENERATING SOFTWARE APPLICATIONS

TECHNICAL FIELD OF THE INVENTION

This invention relates generally to systems and methods for generating software applications, more specifically to object-oriented systems and methods for visually generating software applications.

BACKGROUND OF THE INVENTION

A major advantage in the area of information technology has been the growth of networking. Networking permits sharing of common resources and databases among a group of computer users. A client-server network consists of a plurality of servers connected via a communication bus to a plurality of clients such as desktop PCs. The servers in a client-server network are configured to handle various services such file handling, printer services, management of communication across the network, and security services. As the number of clients and servers increases, managing a network can become a formidable task.

Various means can be implemented to manage high-volume networks. One particular solution is to hire specialists who have experience managing a large number of servers. These specialists can write and implement ad hoc coded scripts that automate network management tasks. Unfortunately, this can be a time-consuming, costly solution and may not be an option for smaller businesses.

A second approach to network management may be to implement object-oriented software packages. An object-oriented software package is a package that can achieve various goals while minimizing or eliminating the necessity of coding or scripting. Object-oriented software packages may implement modularized software functions called objects. Each object is a self-contained function that may contain both data and procedures to manipulate the data. Objects are assembled, sequenced, and linked to achieve an overall desired task. Object-oriented programming enables users to implement a multitude of objects linked together without the necessity of reinventing the wheel. Each object may be implemented many times for various tasks. Each object eliminates the necessity of writing many lines of code to accomplish the same task.

Presently, various packages exist that implement modularized functions to achieve network management tasks. For instance, FINAL for Windows NT is offered by FastLane. FINAL incorporates a high-level scripting language. The scripting language is a language written on a higher level than code. FINAL's scripting language incorporates a multitude of functions to achieve the desired task. FINAL also implements a built-in editor which allows drop-and-drag editing of functions. Unfortunately, FINAL is for NT servers only. Also, FINAL requires the user to learn the high-level scripting language to implement the software package.

In contrast to FastLane's FINAL, Norton Administrator For Networks NAN by HP, formerly by Symantec, supports both NetWare and NT servers. NAN also incorporates a visual interface and built-in scripts to customize and automate many network tasks. Unfortunately, however, NAN also requires a certain amount of scripting to accomplish various network tasks.

As an alternative to the scripting involved with FINAL and NAN, there exist certain software packages that do eliminate the scripting required to link various objects and functions together. For instance, OZONE by V_Graph Incorporated links various objects defined by the user at a graphical user interface. No scripting is involved to accomplish the desired task. Unfortunately, however, OZONE may require the purchase of third-party VBX controls. This may be costly and not an option for small businesses.

A network administrator's main concern is keeping the server and network running properly. Therefore, network management tasks need to take as little time as possible. Unfortunately, ad hoc methods tend to be expensive and require a fair amount of time from the network administrator or support staff. Consequently, network administrators may look towards object-oriented software packages. Unfortunately, some object-oriented software packages may require knowledge of a scripting language specific for that package to link objects or functions together. Other packages may require a script written in a common programming language to be run on a framework provided by the package. In addition, certain packages require a third-party utility for screen design or third-party control objects, which incur additional, undesirable expenses.

SUMMARY OF THE INVENTION

The present invention provides an object-oriented system and method for visually generating software applications that substantially eliminates or reduces disadvantages and problems associated with previously developed systems and methods used for generating software applications.

More specifically, the present invention provides an object-oriented system for visually generating software applications. The object-oriented system for visually generating software applications includes a visual interface for defining and linking control objects and corresponding services to create an intermediate command instruction file. Further, the present invention allows any control object as well as any command instruction file to edited and/or modified at any time. Also included is a run-time program for interpreting the intermediate command instruction file and generating the desired applications.

Currently, there does not exist an object-oriented software package specifically tailored for network administration that does not require some amount of scripting. Therefore, a need exists for an easily implemented, low-cost network management tool capable of performing a multitude of tasks. This management tool should include the best common practices used to support a network as well as custom tasks deemed necessary by a network administrator or the network support staff. Ideally, the management tool should not require the purchase of third-party controls (objects) or interfaces to implement the tool. Lastly, the tool should not require the network administrator or support staff to perform scripting to implement the various network management tasks.

The present invention provides an important technical advantage by enabling visual development of network management applications. The applications are created through a point-and-click visual interface and well-organized dialog boxes. Options are presented to the user in a clear and concise manner. These characteristics provide network management software applications that can be generated in a fairly spontaneous manner. The present invention, however, is not limited to developing network management software applications and can easily be adapted to create applications for various specialties.

Also, the present invention provides yet another technical advantage in that it can adapt network management to the needs of the customer. A customer can determine what necessary tasks need to be performed and quickly implement them with the present invention. This characteristic may be particularly useful to HelpDesk operators who need to create ad hoc network management tools to resolve crisis issues.

The present invention provides yet another technical advantage by expanding upon basic network management with the unique customizable services. In addition to supporting industry platform services, the present invention incorporates unique (custom) services crafted from acquired knowledge and insight of the NetWare and NT operating environments. In addition to industry platform services, these custom services can be placed as options when defining control objects.

Still another technical advantage is that the system provides for heterogeneous network management. The system can perform network management tasks on both NetWare servers and NT servers.

In addition, the present invention provides a technical advantage in that it does not require the user to purchase controls from third party vendors. Due to the granularity of controls and services offered in the present invention, the controls and services are basic building blocks and can serve a variety of functions.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIG. 1 is a flow diagram of one embodiment of the present invention;

FIG. 3 is a larger view of the toolbar in FIG. 2;

FIGS. 4A and 4B illustrate the TreeView Services and Add Service dialog boxes used to populate a TreeView control object;

DETAILED DESCRIPTION OF THE INVENTION

Preferred embodiments of the present invention are illustrated in the FIGUREs, like numerals being used to refer to like and corresponding parts of various drawings.

The present invention provides an object-oriented system and method for visually developing software applications. FIG. 1 is a flow diagram of the overall process of one embodiment of the present invention. At step 10 a user is presented with a well-organized, visual interface to direct and prompt the user. At step 12 the user selects a control object and then defines the services to populate the control objects at step 14. At step 16 rules can be implemented to further define the selected services chosen at step 14. The user can repeat the selection and definition process at step 18. This can be done multiple times. Once the control object has been defined, it can be edited and modified in addition to being deleted. The control object can be edited as often as needed. Lastly, as step 24, the user can implement a run-time program to produce the desired application output 26.

Figure 2:
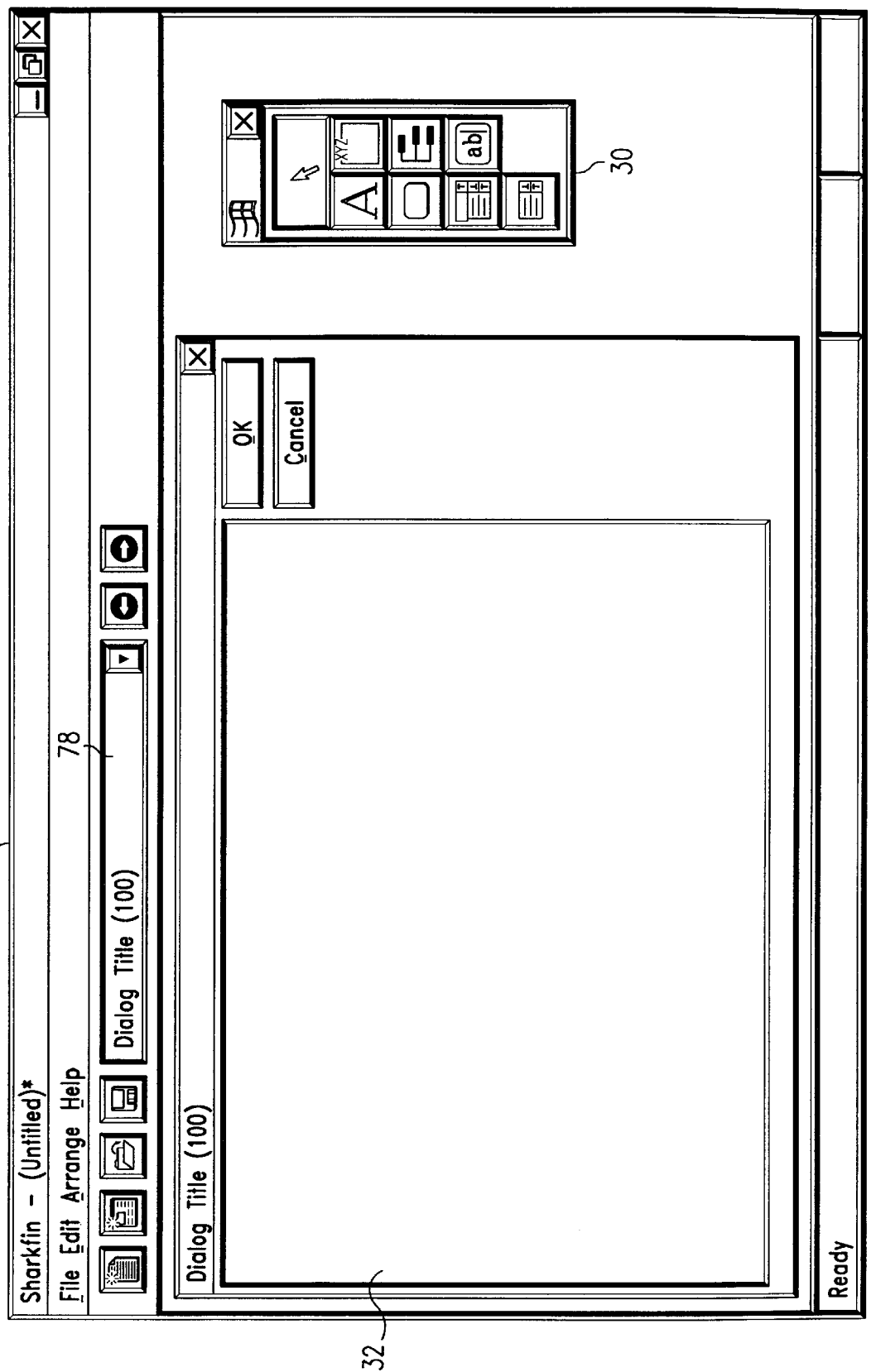
FIG. 2 is the initial screen view comprising a toolbar, menu bar, and dialog box.

FIG. 2 is the opening screen view of an embodiment of FIG. 1 tailored to develop network management applications. An administrator is presented with a menu bar 28, toolbar 30, and an initial dialog box 32. This represents step 10 in FIG. 1. The administrator may implement a mouse to choose an object from the toolbar 30 and place the corresponding object in the dialog box 32. This represents step 12 in FIG. 1. The administrator may then define or configure the object by interacting with well-organized additional dialog boxes that present the administrator with clear options. The menu bar 28 consists of various commands that allow the administrator to edit and arrange various objects in the dialog box 32. The menu bar 28 also allows the administrator to save the file being created.

FIG. 3 illustrates the toolbar 30 in greater detail. The toolbar 30 may contain icons representing a cursor 34 and other objects. These objects include a text control 36, a group box 40, a button control 42, a TreeView control 44, a drop-down control 46, an edit text control 48, and a ListView control 50.

Figure 4B:
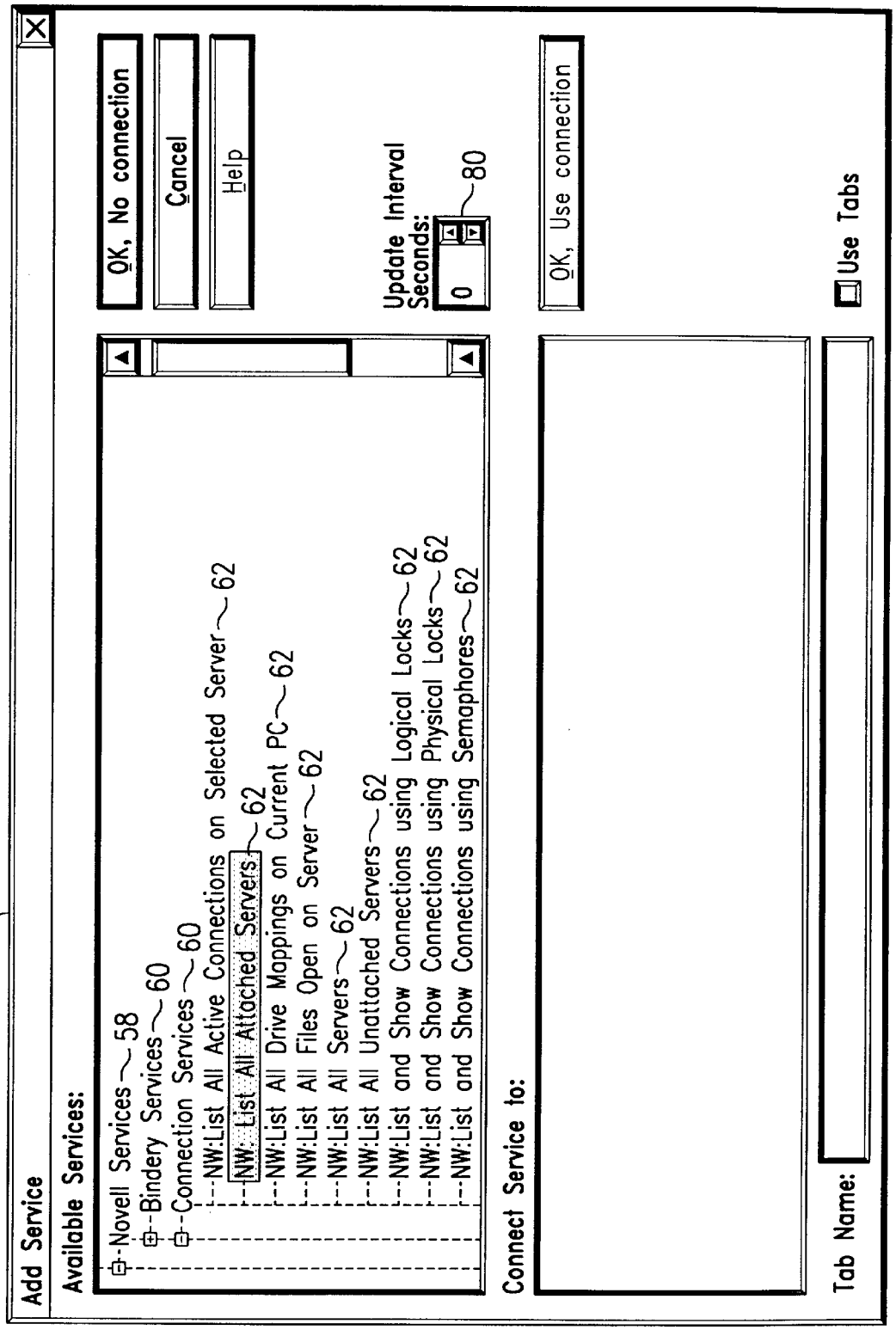

FIGS. 4A, 4B, 5A, 5B, and 6 illustrate the simple task of defining a TreeView control 44. Once the TreeView control 44 has been chosen and placed in the initial dialog box 32, an administrator can populate the TreeView control 44 with custom or industry platform services. This is represented as step 14 in FIG. 1. FIG. 4A represents the TreeView Services dialog box 52. By choosing to add a service by implementing the Add Service button 54, the administrator will be prompted with the Add Service dialog box 56 illustrated in FIG. 4B. Contained within the Add Service dialog box 56 are the available custom and industry platform services. In this embodiment, a family 58 may be represented by a industry platform services such as Novell Services. A subfamily 60 may be represented by Bindery services or Connection services. A service 62 may be represented by items below the sub-family such as "NW:List All Attached Servers." The administrator may choose any service 62 that is needed to define the TreeView control 44. The services 62 are not limited to one industry platform. Nothing prevents the administrator from choosing an NT service for one TreeView control 44 and a NetWare service for another. Additionally, the administrator may choose an NT service and a NetWare service in the same TreeView 44. Thus, the system supports heterogeneous network services.

Figure 5A:
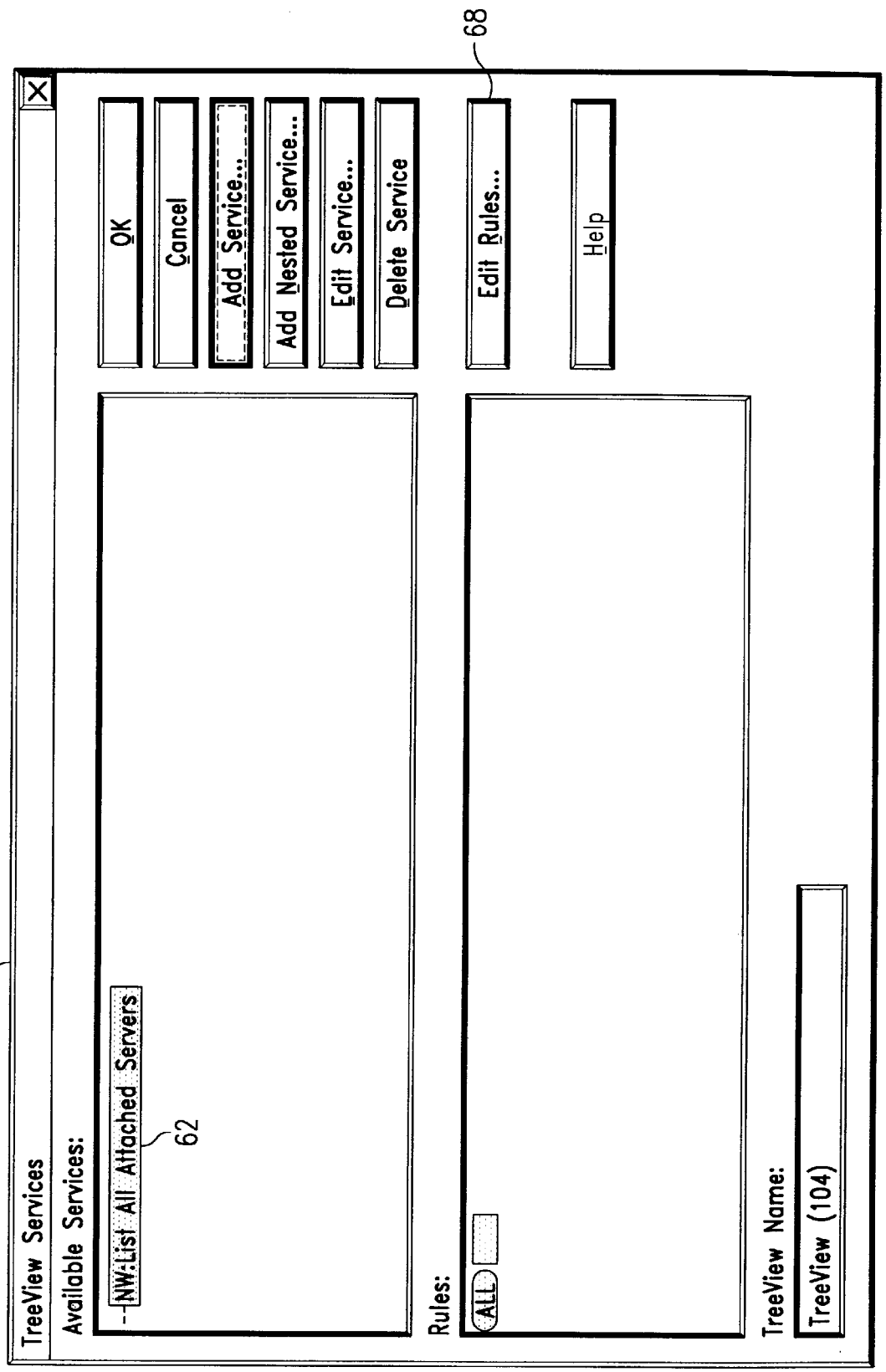
FIGS. 5A and 5B include an additional view of the TreeView Services dialog box with selected service and a view of the Rule page.
Figure 5B:
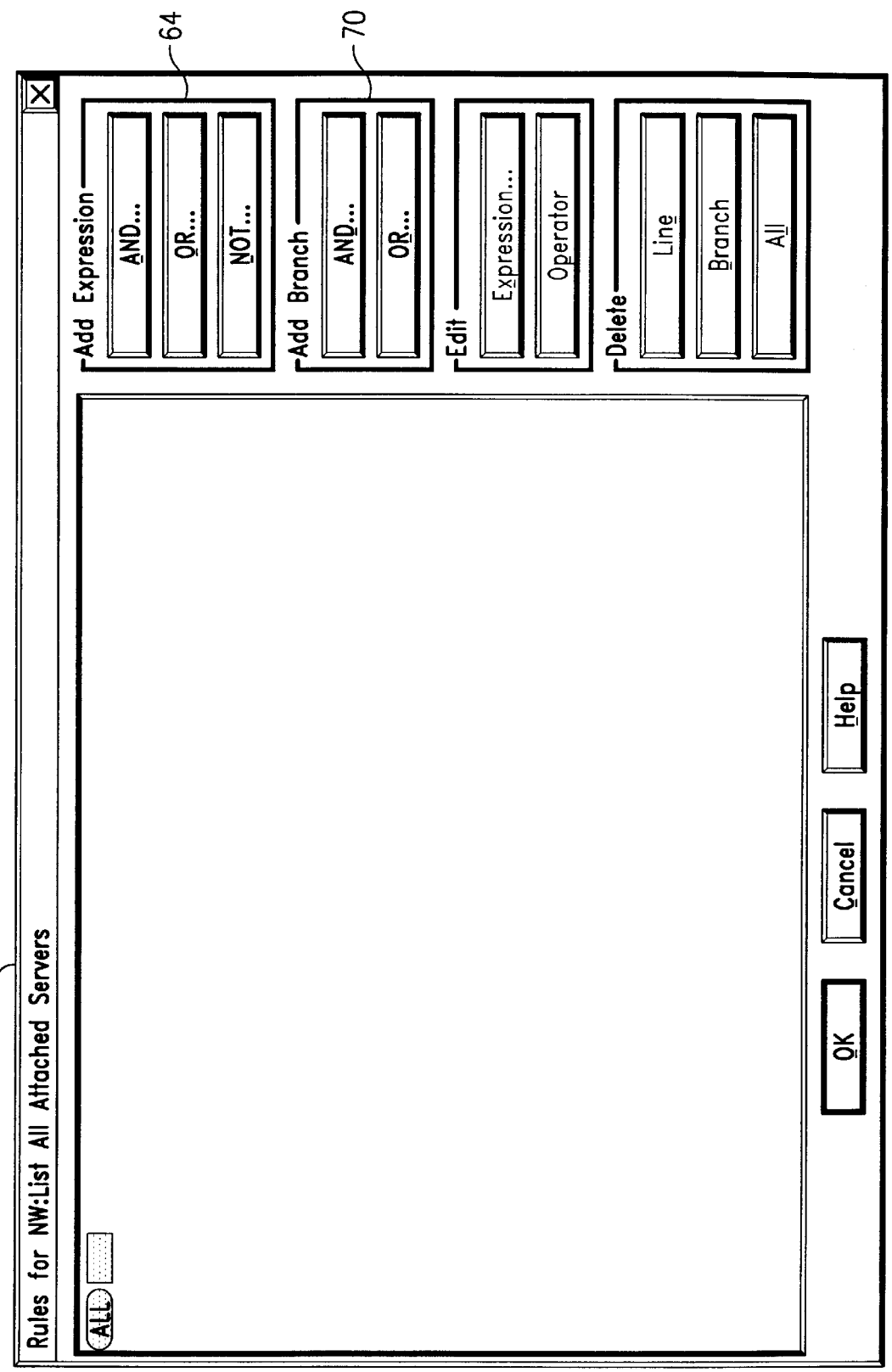

FIG. 5A represents the TreeView Service dialog box 52 with a service 62 "NW:List All Attached Servers" displayed. The administrator may decide to add the service 62 or further refine the service 62 based on a set of logical operators 64 available in a Rule page 66 for the service 62. This represents step 16 in FIG. 1. The Rule page 66 is shown in FIG. 5B. The logical operators 64 include "and", "or", "not" and may be viewed on the left-hand side of the Rule page 66. The Rule page 66 may be activated by implementing the Edit Rules button 68 on the TreeView Service dialog box 52. The Rule page 66 may allow for nested rules by implementing the Add Branch logical operators 70.

Figure 6:
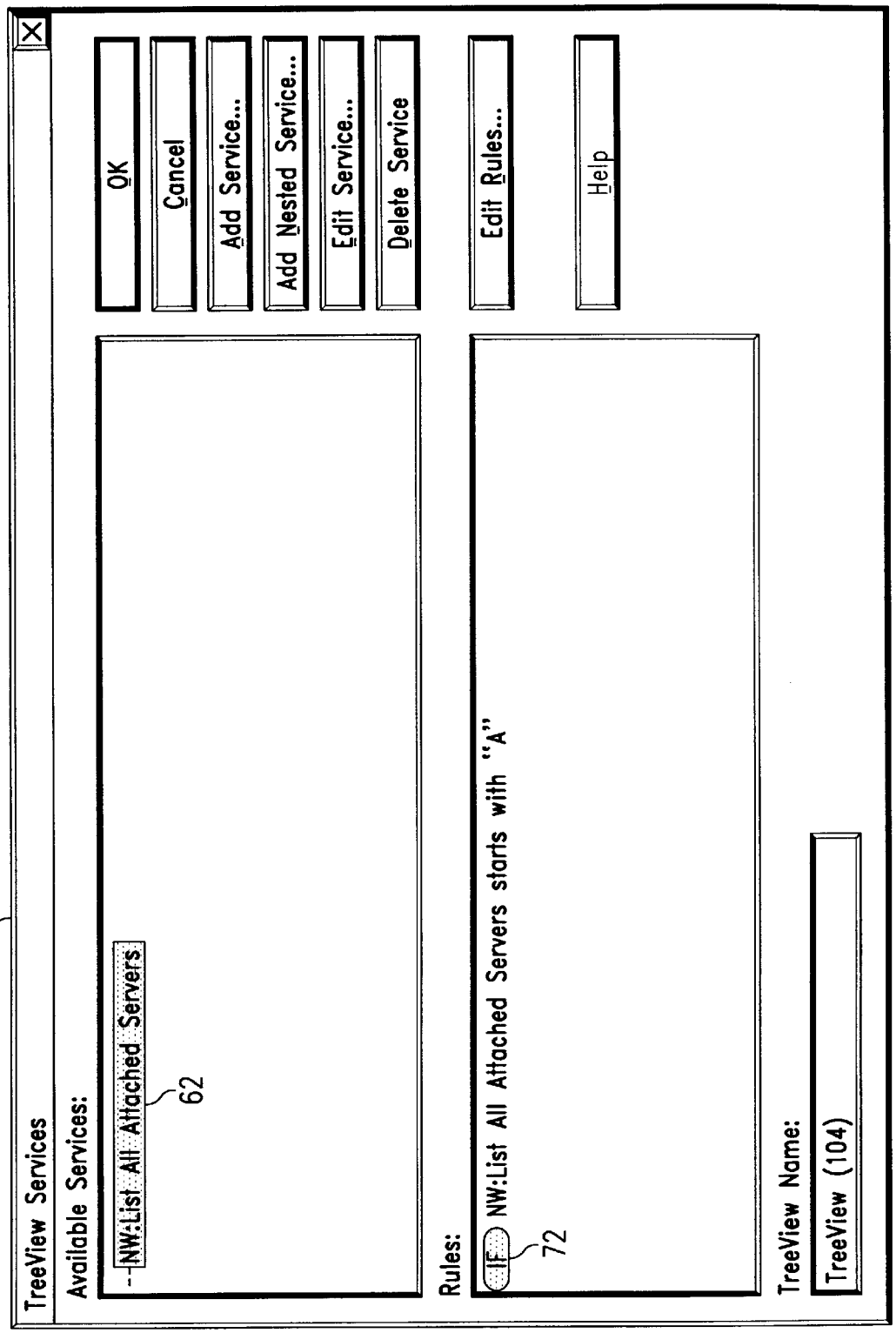
FIG. 6 illustrates the TreeView Services dialog box with Selected Service and corresponding rule.

FIG. 6 represents the TreeView Service dialog box 52 with a service 62 and a corresponding rule 72. For this particular example shown in FIGS. 4A, 4B, 5A, 5B and 6, the embodiment of the present invention can create an application 26 that lists all attached NetWare servers that start with A.

Figure 7:
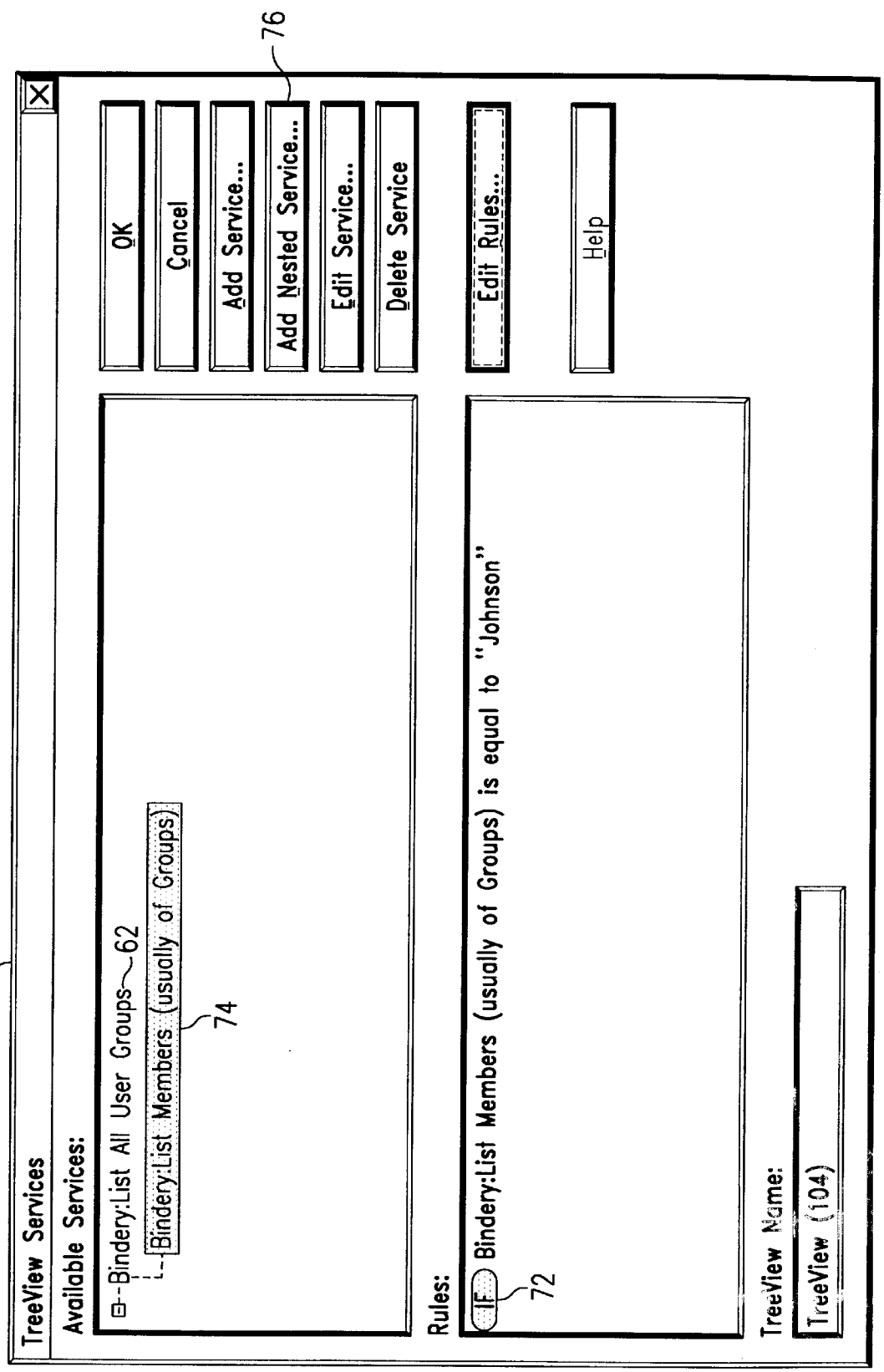
FIG. 7 illustrates nested services in the TreeView Services dialog box.

FIG. 7 illustrates another view of the TreeView Services dialog box 52. Each TreeView Service 62 may be chosen to have additional services nested below. These nested services 74 may further refine or organize the desired network management task. This may be accomplished by implementing the Add Nested Service button 76.

Each nested service 74 may also be subject to any logical operators 64, 70 as discussed previously with reference to FIG. 5B. Each nested service 74 can have its own rules 72. Rules 72 are not inherited from prior services 62, but they do operate on the output of prior services 62 and their corresponding rules 72. Rules 72 are bound only to the services 62 and the nested services 74 they accompany. The logical operators 64, 70 define the rule 72 which is applied to the nested service 74. For the particular example illustrated in FIG. 6, a list of all clients named "Johnson" for each administrator group would be displayed.

The embodiment of the present invention is not limited to TreeView controls 44. If desired, the user can add and define multiple objects. This represents step 18 in FIG. 1. The user can open the prompt for available services 62 for any of the objects in the toolbar 30 except the group box 40 by placing the mouse cursor over the object and pressing the right mouse button. As shown in FIG. 3, the toolbar 30 can also include a text control 36, group box 40, a button control 42, a drop-down control 46, an edit text control 48, and a ListView control 50. The group box 40 allows for a visual definition of a boundary encompassing related objects. The group box 40 allows the user to "draw" a box on the screen around other objects. The group box 40 is not defined to contain services 62. The drop-down control 46 allows for the inclusion of a single 'listing' services. 'Listing' services are services that can return multiple values. For instance, all the services found in the TreeView Services dialog box 52 are 'Listing Services.' A 'listing' service can return multiple values, such as a list of all USERs on a server. The edit text control 48 allows for the inclusion of a single 'non-listing' service. The 'non-listing' services return only a single result such as a USER's department. In addition to displaying this single result, the edit text control 48 allows for the editing of the single result. The text control 36 allows for the inclusion of a single 'non-listing' service. The 'non-listing' result returns only a single result such as a USER's name. The button control 42 allows for a multitude of functions. These functions may include:

opening another dialog page;

closing current dialog page;

issuing an immediate refresh to other controls on the same page;

saving data from controls to another medium such as a file or a printer;

opening a purpose built editor such as a binary editor for viewing and/or modifying binary data;

opening one of several purpose dialogs such as one to change a USER's password, reset a USER's intruder lockout, send a message to all USERS;

modifying edited data such as editing a USER's department name; and other uncontemplated actions.

Lastly, the ListView control 50 allows for the inclusion of a single 'listing' service and, optionally, one or more columns of single-instance data related to the 'listing' service. For instance, a ListView control may be configured to display a list of all NetWare Servers ('listing' service), what version of NetWare they are running (column 1: single-instance data), how many users are logged on to that server (column 2: single-instance data) and the time the server was last rebooted (column 3: single-instance data).

In the embodiment of the present invention, not only can industry platform services 62 be nested and rules applied, objects can be linked, representing step 20 in FIG. 1. Again, these objects include the TreeViews 44, text controls 36, button controls 42, edit text controls 48, drop-down controls 46, and ListView controls 50, illustrated in the toolbar 30 in FIG. 3. An administrator may connect a TreeView control to another TreeView, a button to a TreeView, text to a TreeView, any control to any control, as long as the reference is not circular.

In addition to linking objects, the administrator may link dialog boxes 32. As seen in FIG. 2, the title 78 of the dialog box 32 is Dialog Title 100. Additional dialog boxes 32 may be added by implementing the Edit command in the menu bar 28. The administrator is not limited to one dialog box 32. Also, dialog boxes 32 and objects can be linked in non-circular manners to achieve any layered variety of services deemed necessary by the administrator to achieve the desired network management task.

Updating of tasks may also be implemented. An Update Interval Seconds box 80 is shown in FIG. 4B. This application can update the desired task based on the input into the Update Interval Seconds box 80. For instance, a network administrator may want to see what clients are logged on to a particular server as time progresses. By implementing the Update Interval Seconds box 80, the administrator can view the information updated each time interval.

Once the desired objects have been defined and, if desired, linked, the administrator can save the file, representing step 22 in FIG. 1. The saved file is a command instruction file including objects (which are the combination of controls and services 62), corresponding rules 72, and corresponding links to other objects. The command instruction file is then fed into a run-time program (RTP) that interprets the objects, rules, and sequencing and then generates the desired application outputs 26, representing step 24 in FIG. 1. The RTP may not provide an interface of its own; it can express dialog boxes (pages) defined in the command instruction file. Currently, the RTP runs on a Windows 95/98 (collectively:9x) and Windows NT (Workstation or Server). To support NetWare and NT, the RTP attempts to bind to NetWare and NT Dynamic Link Libraries (DDLs). Thus, the RTP expects to be run in an environment from which the command instruction file desires the data. It is important to note that the RTP does not require NetWare or NT, it just so happens that the currently implemented services discussed for this embodiment of the present invention are for one or the other platform. Ultimately, the output from the RTP appears exactly as defined in the visual interface that produced the command instruction file.

Both the visual interface and the RTP can be written in Visual C++. Certain services 62, such as the custom services, may be written in Visual C++, Assembly language, and Watcom C++. The present invention, however, is not limited to C++ and can easily be implemented using other languages.

An important advantage of the present invention is that visual point-and-click interface enables the user to choose objects from the toolbar 30, to place them in a selection dialog box 32, and to interact with multiple prompting dialog boxes. Prompting dialog boxes such as the Add Service dialog box 56 and the Rules dialog box 66 further define the application 26. The visual interface encapsulates all programming code, enabling quick development of applications 26 in a clear, concise format.

The present invention provides another important technical advantage in that it provides the ability to visually define links between services 62. More specifically, in the Tree-View control 44, the present invention enables the definition of ad hoc links between services 62. In other words, it allows the definition of nested services 74.

Also, the present invention provides the ability to visually define ad hoc links between controls. Therefore, ad hoc links between their respective services 62 can be achieved. The ability to link various combinations of controls and services in a non-circular manner enables the user to develop a vast number of applications which may only be limited by the imagination of the user.

An important advantage of the network management embodiment of the present invention is that it operates simultaneously with both NetWare and NT. Both NT services and NetWare services can be incorporated within one object. This enables network administrators to manage networks with NT and NetWare servers without requiring the purchase of separate software packages to manage each type of server. Additionally, the services 62 chosen to populate the various objects are not limited to the industry platform services provided by industry platforms such as NT and NetWare. Additional customized services can be added to the Add Service dialog box 56 as shown in FIG. 4B. Note that there is no visual or other indication of whether a service 62 is an industry platform service or a custom service. Custom services and industry platform services are seamlessly integrated amongst one another. Such services may rely on NetWare Loadable Modules (NLMs), Kernal Drivers, and Virtual Device Drivers (VxDs), depending on the operating environment. Other custom services may be special constructions of existing industry standard services. These custom services may not be provided by Microsoft or NetWare, yet they may be desired by a network administrator. Ultimately, the services provided can include many network services such as SNMP, RMON, DMI, and customized services to provide the user with a powerful, heterogeneous network management tool.

Another important advantage of the present invention is that it does not require the purchase of third party controls such as VBX controls. The TreeView controls 44, text controls 36, group boxes 40, button controls 42, drop-down controls 46, edit text controls 48, and ListViews 50 are low-level objects included in Windows 95/98 (collectively:9x) and Windows NT (Workstation and Server). Thus, a user can implement the system without incurring additional expenses due to the cost of high-level third party controls.

It is important to note that the present invention is not limited to network management tasks. The sum and substance of the present invention lies in the object-oriented visual system that quickly develops applications. The present invention can be easily modified to develop applications unrelated to network management tasks. For instance, a business may want to keep track of information regarding clients, shipments, billings, employees and various other interactions. The present invention is easily applicable to services provided by such an industry. Therefore, it is obvious that the present invention is extensible to many various industries and tasks.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. An object-oriented method for visually creating applications on a computer in an object-oriented framework comprising;
    selecting at least one object in a visual interface;
    defining said at least one object in said visual interface by associating said at least one object with at least one service;
    generating a command instruction file with configuration information of said at least one object, said configuration information being associated with said at least one service; and
    implementing a run-time program to interpret said command instruction file to generate said application output.

2. The method of claim 1, wherein the visual interface further comprises a menu bar, a tool bar comprising object icons, at least one selection dialog box, and a plurality of prompting dialog boxes, said plurality of prompting dialog boxes further comprising an available services dialog box and a rule dialog box.

3. The method of claim 2, wherein said at least one object further comprises button controls, drop-down controls, TreeView controls, text controls, edit text controls, and ListView controls.

4. The method of claim 3, wherein the step of selecting at said least one object further comprises:
    directing with a cursor a selected object icon representing a selected object;
    dragging said selected object icon to a selection dialog box; and
    dropping said selected object icon in said selection dialog box.

5. The method of claim 4, wherein the step of defining said at least one object further comprises selecting from said available service dialog box services to define said at least one object.

6. The method of claim 5, further comprising the step of implementing logical operators in said rule dialog box to further modify said services.

7. The method of claim 6, further comprising the step of implementing a save option on said menu bar to generate said command instruction file.

8. The method of claim 7, wherein said applications are network management applications.

9. The method of claim 8, wherein said available services comprise industry platform services.

10. The method of claim 9, wherein said available services further comprise custom services.

11. The method of claim 10, further comprising the step of combining industry platform services from different industry platforms within a single object.

12. The method of claim 11, further comprising the step of combining industry platform services and custom services within a single object.

13. The method of claim 7, further comprising the step of:
    interlinking at least a portion of said services; or
    interlinking none of said services.

14. The method of claim 7, wherein said at least one object is a plurality of objects.

15. The method of claim 14, further comprising the step of:
    interlinking at least a portion of said plurality of objects; or
    interlinking none of said plurality of objects.

16. The method of claim 15, wherein said command instruction file and said at least one object can be edited or modified.

17. A system including an software program stored in a computer readable form on a tangible storage medium for visually creating applications, said visual software program comprising:

a visual interface for selecting at least one object, defining said at least one object in said visual interface by associating said at least one object with at least one service, and, generating a command instruction file with configuration information of said at least one object, said configuration information being associated with said at least one service; and a run-time program for interpreting said command instruction file and generating said application output.

18. The system of claim 17, wherein said visual interface further comprises a menu bar, a tool bar comprising object icons, at least one selection dialog box, and a plurality of prompting dialog boxes, said plurality of prompting dialog boxes further comprising an available services dialog box and a rule dialog box.

19. The system of claim 18, wherein said at least one object further comprises button controls, drop-down controls, TreeView controls, text controls, edit text controls, and ListViews controls.

20. The system of claim 19, wherein selecting at said least one object further comprises:

directing with a cursor a selected object icon representing a selected object;

dragging said selected object icon to a selection dialog box; and dropping said selected object icon in said selection dialog box dialog box.

21. The system of claim 20, wherein defining said at least one object further comprises selecting from said available service dialog box services to define said at least one object.

22. The system of claim 21, further comprising logical operators in said rule dialog box to further modify said selected services.

23. The system of claim 22, further comprising a save option on said menu bar to generate said command instruction file.

24. The system of claim 23, wherein said applications are network management applications.

25. The system of claim 24, wherein said available services comprise industry platform services.

26. The system of claim 25, wherein said available services further comprise custom services.

27. The system of claim 26, wherein defining at least one object further comprises combining said industry platform services from different industry platforms within a single object.

28. The system of claim 27, wherein defining at least one object comprises combining said industry platform services and said custom services within a single object.

29. The system of claim 23, wherein defining at least one object further comprises:

interlinking at least a portion of said services; or interlinking none of said services.

30. The system of claim 23, wherein said at least one object is a plurality of objects.

31. The system of claim 30, wherein defining said plurality of objects further comprises:

interlinking at least a portion of said plurality of objects; or interlinking none of said plurality of objects.

32. The system of claim 31, wherein said command instruction file and said at least one object can be edited or modified.

33. A method for visually creating a network management tool on a computer in a visual interface, the method comprising:

selecting at least one visual element;

configuring said at least one visual element by selecting at least one pre-defined service;

selectively implementing at least one rule associated with the service;

saving a configuration of said at least one visual element in a definition file, said configuration being associated with said at least one pre-defined service; and implementing a run-time program to interpret said definition file, the run-time program operating to provide an application output.

34. The method of 33, the method further comprising: selecting a second visual element; and linking said second visual element to said at least one visual element.

35. The method of 33 wherein the application output comprises a display of network characteristics.

36. The method of 33 wherein the application output comprises an interactive graphical user interface.

* * * * *